United States Patent Office 3,484,466
Patented Dec. 16, 1969

3,484,466
PREPARATION OF AROMATIC SULFONYL ISOCYANATES
Adnan A. R. Sayigh, North Haven, and Henri Ulrich, North Branford, Conn., assignors to The Upjohn Company, Kalamazoo, Mich., a corporation of Delaware
No Drawing. Continuation-in-part of application Ser. No. 396,359, Sept. 14, 1964. This application Sept. 30, 1966, Ser. No. 583,448
Int. Cl. C07c *143/80, 161/04;* A01n *9/18*
U.S. Cl. 260—397.7                              5 Claims

ABSTRACT OF THE DISCLOSURE

A semicontinuous process is described in which an aromatic sulfonamide is phosgenated, in the presence of an inert solvent and a catalytic amount of a hydrocarbyl isocyanate, to form the corresponding aromatic sulfonylisocyanate and the mixture of inert solvent and hydrocarbyl isocyanate catalyst is recovered from the reaction product and reused in the phosgenation of a subsequent batch of aromatic sulfonamide. m- and p-isothiocyanatobenzenesulfonyl isocyanate, useful as fungicides, are also disclosed.

CROSS-REFERENCE TO RELATED APPLICATIONS

This application is a continuation-in-part of application Ser. No. 396,359, filed Sept. 14, 1964, now U.S. Patent 3,371,114.

This invention relates to a process for the preparation of sulfonyl isocyanates and is more particularly concerned with a novel process for the preparation of arenesulfonyl isocyanates.

Methods previously described for the preparation of organic sulfonyl isocyanates by phosgenation of the corresponding sulfonamides suffer from the disadvantage that they have required comparatively high reaction temperatures and have afforded relatively low yields of the desired product. For example, British Patent 692,360 describes the preparation of p-toluenesulfonyl isocyanate in 1,2,4-trichlorobenzene at a temperature of 213° C. King, J. Org. Chem. 25, 352, 1960, in repeating the procedure of the above British patent reported that the desired p-toluenesulfonyl isocyanate required fractional distillation giving an overall yield of 54%.

We have now found that using the process of the present invention the phosgenation of arenesulfonamides can be accomplished at much lower temperatures than possible hitherto and without the necessity to use a large excess of phosgene. Further the resulting arenesulfonylisocyanates are obtained in high yield and satisfactory state of purity.

The improved process of the invention comprises reacting the appropriate arenesulfonamide with phosgene in the presence of an organic isocyanate. The reaction is advantageously conducted by heating the reactants at a temperature within the range of about 60° C. to about 200° C. and preferably from about 80° C. to about 180° C. in the presence of an inert organic solvent.

The process of the invention is of general application and can be employed in the conversion of any arenesulfonamide to the corresponding arenesulfonyl isocyanate. The only limitation on the nature of the arenesulfonamide employed as starting material is that it should be free from substituents which are reactive with phosgene with the sole exception that the starting arenesulfonamide can contain at least one nuclear amino group which group will be converted to isocyanato by the process of the invention. Examples of substituents which are unreactive with phosgene i.e. which undergo substantially no change when submitted to the action of phosgene under the conditions of the process of the invention, are alkyl, for example, methyl, ethyl, isopropyl, hexyl, octyl, and the like; alkoxy such as methoxy, ethoxy, propoxy, pentyloxy, octyloxy, and the like; alkylthio, such as methylthio, ethylthio, propylthio, hexylthio, octylthio, and the like; halo, i.e. fluoro, chloro, bromo and iodo; tertiary amino such as dimethylamino, diethylamino, dipentylamino, methylethylamino, pyrrolidino, 2,2-dimethylpyrrolidino, piperidino, N-methylpiperazino, N-ethylpiperazino, morpholino, hexamethyleneimino, and the like; alkoxycarbonyl such as methoxycarbonyl, propoxycarbonyl, hexyloxycarbonyl, octyloxycarbonyl and the like; nitro; cyano; thiocyano; and the like.

The arenesulfonamiden employed as starting materials in the process of the invention can have one or more sulfonamide groups in the molecule each of which sulfonamide groups will be converted to sulfonylisocyanate under the conditions of the reaction. The arene moiety of the arenesulfonamide can be the residue of any monocyclic or polycyclic aromatic hydrocarbon the only limitation being that set forth above in regard to the nature of the substituents which can be present in the aromatic nucleus. For example, the arene moiety can be phenyl, naphthyl, biphenylyl, phenanthryl, anthracenyl and the like, all of which can be substituted by groups unreactive with phosgene as defined above.

The organic isocyanates which are employed as catalysts in the process of the invention are hydrocarbyl mono- or polyisocyanates, the only limitation on the nature of the hydrocarbyl moiety being that it should be free from substituents which are reactive with phosgene as discussed above. Representative hydrocarbyl moieties are alkyl such as methyl, ethyl, isopropyl, hexyl, decyl, undecyl, octadecyl and the like; cycloalkyl such as cyclobutyl, cyclopentyl, cyclohexyl, cycloheptyl, cyclooctyl, and the like; alkenyl such as vinyl, allyl, butenyl, pentenyl, octenyl, dodecenyl, octadecenyl and the like; cycloalkenyl such as cyclopentenyl, cyclohexenyl, cyloheptenyl, cyclooctenyl, and the like; aralkyl such as benzyl, phenethyl, phenylpropyl, benzhydryl, naphthylmethyl, and the like; and aryl such as phenyl, naphthyl, biphenylyl, anthracenyl, phenanthryl and the like. The hydrocarbyl moieties such as the alkyl, cycloalkyl, alkenyl, cycloalkenyl, aralkyl, and aryl radicals exemplified above can each be substituted by one or more substituents unreactive with phosgene as defined above.

Representative of the isocyanates which can be employed in the process of the invention are:

ethyl isocyanate,
butyl isocyanate,
hexamethylene diisocyanate,
3-nitropropyl isocyanate,
4-ethoxybutyl isocyanate,
3,3,3-trifluoropropylisocyanate,
2-methylthioethyl isocyanate,
3-dimethylaminopropyl isocyanate,
2-carbethoxybutyl isocyanate,
4-cyanobutyl isocyanate,
phenyl isocyanate,
3-bromophenyl isocyanate,
4-nitrophenyl isocyanate,
2-methoxyphenyl isocyanate,
4-methylthiophenyl isocyanate,
o-tolyl isocyanate,
phenylene-1,4-diisocyanate,
tolylene-2,4-diisocyanate,
4,4'-methylene diphenyl diisocyanate,
2-naphthyl isocyanate,
4-biphenylyl isocyanate,
allyl isocyanate,
4-nitrobutenyl isocyanate,
cyclopentyl isocyanate,
2-methylcyclohexenyl isocyanate, benzyl isocyanate,
p-nitrobenzyl isocyanate,
phenethyl isocyanate,
benzhydryl isocyanate, and the like.

Representative of the arenesulfonamides which can be converted to the corresponding arenesulfonyl isocyanates according to the process of the invention are:

benzenesulfonamide,
p-toluenesulfonamide,
o-toluenesulfonamide,
phenylene-1,3-disulfonamide,
4-bromobenzenesulfonamide,
3-methoxybenzenesulfonamide,
4-chloro-3-ethoxybenzenesulfonamide,
4-nitrobenzenesulfonamide,
2,5-dichlorobenzenesulfonamide,
4-carbethoxybenzenesulfonamide,
4-cyanobenzenesulfonamide,
2,6-dimethylbenzenesulfonamide,
2,4,6-trimethylbenzenesulfonamide,
2-naphthalenesulfonamide,
4-naphthalenesulfonamide,
3-phenylbenzenesulfonamide,
2-anthracenesulfonamide,
1-chloro-2-naphthalenesulfonamide,
4-methyl-2-naphthalenesulfonamide,
4-chloro-1-naphthalenesulfonamide,
4-sulfanilamido-1-naphthalenesulfonamide,
3-isothiocyanatobenzenesulfonamide,
4-isothiocyanatobenzenesulfonamide,
1-isothiocyanatonaphthalene-4-sulfonamide and the like.

The inert organic solvent employed in the process of the invention can be any organic solvent which does not enter into reaction with any of the reactants or in any other way interfere with the process of the invention. Illustrative of inert solvents which can be employed are: aliphatic hydrocarbons such as pentane, hexane, heptane, octane, and the like; aromatic hydrocarbons such as benzene, toluene, xylene and the like; chlorinated aliphatic hydrocarbons such as chloroform, carbon tetrachloride, methylene chloride, ethylene dichloride, and the like; chlorinated aromatic hydrocarbons such as chlorobenzene, dichlorobenzene, trichlorobenzene, chlorotoluenes, chloroxylenes, and the like; nitro substituted aromatic hydrocarbons such as nitrobenzene, o-nitrotoluene, m-dinitrobenzene, 4-nitro-m-xylene, and the like, and nitro substituted aliphatic hydrocarbons such as nitromethane, nitroethane, nitropropane, and the like.

In carrying out the process of the invention the arenesulfonamide, the hydrocarbyl isocyanate and the inert organic solvent can be mixed in any order. Advantageously, the arenesulfonamide is dissolved in the inert solvent and the resulting solution is dried by removing a portion of the solvent, before adding the isocyanate to the mixture. Alternatively the inert organic solvent and the arenesulfonamide can be dried separately using other conventional procedures thereby rendering unnecessary the initial drying of the solution of arenesulfonamide in inert organic solvent. It is to be understood that the scope of the invention is not limited by any particular manner of effecting admixture of the reactants.

The reaction is conducted advantageously at a temperature within the range of about 60° C. to about 200° C. and preferably within the range of about 80° C. to about 180° C. The aforesaid mixture of reactants is heated to a temperature within the desired range and maintained therein while phosgene is introduced into the reaction mixture. Advantageously the phosgene is introduced below the surface of the reaction mixture and at such a rate that it is absorbed i.e. no free phosgene passes out of the reaction vessel until the convension of arenesulfonamide to arenesulfonyl isocyanate is complete. We have found that, using the hydrocarbyl isocyanate as catalyst in accordance with the process of the invention, it is only necessary to use phosgene in slight excess of molar proportions with respect to the arenesulfonamide in order to obtain excellent yields of arenesulfonyl isocyanate. Amounts of phosgene in excess of this proportion can be used if desired but offer no advantage in yield or in enhancing the rate of reaction. This finding is in marked contrast to the considerable excess of phosgene which was necessary in the prior art processes.

The desired arenesulfonyl isocyanate can be recovered from the reaction mixture by conventional procedures. For example, when the reaction is completed, as determined by analytical techniques such as infrared spectral analysis, the inert organic solvent is removed by distillation and the arenesulfonyl isocyanate is separated from th hydrocarbyl isocyanate employed as catalyst. Where the latter compound is of fairly low boiling point it will generally be removed in company with the inert organic solvent. Otherwise, the arenesulfonyl isocyanate can be separated from the hydrocarbyl isocyanate catalyst by fractional distillation in the case of liquids or by fractional crystallisation, chromatography, countercurrent distribution, and like conventional techniques in the case of solids.

The hydrocarbyl isocyanate employed in the process of the invention is generally present in catalytic quantities, i.e. in quantities less than stoichiometric proportion, in the reaction mixture. Advantageously, the hydrocarbyl isocyanate is employed in the proportion of about 0.1 mole to about 0.8 mole per mole of arenesulfonamide and preferably is employed within the range of about 0.2 mole to about 0.4 mole per mole of arenesulfonamide. It will be appreciated that in certain cases even lower amounts of hydrocarbyl isocyanate can be employed successfully to catalyse the conversion of arenesulfonamides to arenesulfonyl isocyanates. Higher proportions of hydrocarbyl isocyanate than those set forth above can be employed but such higher proportions offer no advantage in rate of reaction or yield of product obtained.

As set forth above, any hydrocarbyl isocyanate, in which the substituents are unreactive with phosgene under the conditions of the reaction, can be employed to catalyse the conversion of arenesulfonamides to the corresponding arenesulfonyl isocyanates according to the process of the invention. Hydrocarbyl isocyanates which have a boiling point of the order of about 60° C. to about 200° C. are particularly advantageous since they normally can be separated very readily from the less volatile arenesulfonyl isocyanates. In many cases, such isocyanates will be removed in admixture with the inert organic solvent when the latter is removed from the reaction mixture by distillation. The mixture of inert solvent and hydrocarbyl isocyanate so recovered by distillation can then be used as the reaction medium for the conversion of further arenesulfonamide and at the end of the reaction, the solvent and isocyanate catalyst can again be recovered and reused.

Typical of hydrocarbyl isocyanates which fall into this category are lower-alkyl isocyanates i.e. alkyl isocyanates wherein the alkyl groups contain from 1 to 8 carbon atoms, inclusive, and the alkylene diisocyanates wherein the alkylene radical contains from 1 to 6 carbon atoms, inclusive.

The hydrocarbyl isocyanates which are employed in the process of the invention can be prepared by procedures well-known in the art; for example, by phosgenation of the corresponding primary amines using procedures such as that described by Siefken, Annalen, 562, 122, 1949. The arenesulfonamides which are employed in the process of the invention also can be prepared by procedures well-known in the art; see, for example, Chemistry of Carbon Compounds, edited by E. H. Rodd, Elsevier Publishng Company, New York, 1954, vol. IIIA, pp. 233–234.

The arenesulfonyl isocyanates which are produced by the process of the invention are useful as agents for the stabilisation of organic isocyanates. Organic isocyanates including both monoisocyanates and polyisocyanates are generally colorless liquids or solids which tend to decompose on storage even in the absence of air and moisture. In some instances, this decomposition results in discoloration of the organic isocyanate, i.e., a change to a light yellow to brown or even, in extreme cases, to dark brown. In other instances, the decomposition results in the formation of products with relatively high melting points and low solubility in the organic isocyanate. If the organic isocyanate is a liquid at the storage temperature, these decomposition products will accumulate in the form of a precipitate. If the organic isocyanate is a solid at the storage temperature, the solid decomposition products are still likely to form but, of course, will not be revealed as a precipitate until the organic isocyanate is melted as it often is prior to transfer from the storage container. In some instances, both discoloration and precipitate formation are observed. In other instances, only one or the other of these decomposition phenomena is observed.

The discoloration of organic isocyanates represents a serious problem where colorless or light colored reaction products are to be produced. Precipitate formation in oganic isocyanates also represents a serious problem when the isocyanates are to be metered through smallbore pipes and valves, or where solid impurities are undesirable in a reaction product, for example, an elastomer fiber or film. Although discolorations can be removed by distillation and undesired solids can be removed by filtration or distillation, the thus treated organic isocyanates often discolor again and/or deposit precipitates within a few days or, in some instances, even in a few hours. It is not economical and is usually impractical to distill or filter an organic isocyanate immediately before use.

It has now been discovered that organic isocyanates can be stabilized against discoloration and/or precipitate formation by having incorporated therewith a stabilizing amount of one or more of the sulfonyl isocyanates produced by the process of this invention.

The optimum amount of the sulfonyl isocyanate for a particular organic isocyanate stabilization problem can readily be determined by small scale experiments which simulate the expected large scale storage conditions. Ordinarily, the necessary amount of sulfonyl isocyanate will be in the range of about 0.1% to about 5% by weight, based on the organic isocyanate. Other inert substances can, of course, be present in the stabilized organic isocyanate composition. For example, a volatile inert solvent can be present when the organic isocyanate is to be used as an adhesive.

The isothiocyanato-substituted arenesulfonylisocyanates produced by the process of the invention are useful as pesticides. For example, these compounds, when formulated as dust, dispersions, emulsions, sprays, aerosols and the like in accordance with procedures conventional in the art, can be used to control fugicidal infestations in growing plants and seeds; for example, they can be used to control seed- and soil-borne fungi, such as those of the Rhizoctonia, Pythia, Sclerotinia, Phytopthora, Collelotrichia, Sclerotia, and Fusaria genera, for example, *Rhizoctonia solani, P. debaryanum, P. ultimum, S. sclerotarium, P. cactorum, C. lindemuthianum, S. rolfsii* and *F. culmorum.*

The arenesulfonylisocyanates produced by the process of the invention are also useful as intermediates. Illustratively, they can be reacted with ammonia or a primary amine, for example, according to the procedure described by Suter et al. J. Amer. Chem. Soc. 55, 2497, 1933, for the reaction of isocyanates with ammonia and with amines, to yield the corresponding arenesulfonylureas, many of which are useful as antidiabetic agents. The arenesulfonylureas so obtained are themselves useful intermediates; for example, they can be reacted with acid halides such as phosgene, phosphorus pentachloride, phosphorus pentabromide, thionyl chloride, and the like, to form the corresponding sulfonylcarbodiimides. The latter compounds can be used, in accordance with German Patent 1,005,726 to stabilise polyesters against ageing and against deterioration under heat and high humidity conditions.

The following examples describe the manner and process of making and using the invention and set forth the best mode contemplated by the inventors of carrying out the invention but are not to be construed as limiting.

EXAMPLE 1

A solution of 85.5 g. (0.5 mole) of p-toluene sulfonamide in 855 ml. of o-dichlorobenzene was dried by azeotropic distillation of the moisture and was cooled to 90° C. before addition of 9.9 g. (0.1 mole of n-butyl isocyanate. The resulting mixture was heated under reflux at 174 to 176° C. and approximately 1 mole of phosgene was passed in over a period of about 100 minutes. At the end of this time the conversion to sulfonylisocyanate was judged complete by the disappearance of the NH absorption at 3.1$\mu$ in the infrared spectrum. The excess phosgene was removed by purging the reaction mixture with nitrogen for 30 minutes at reflux temperature. The solvent and n-butyl isocyanate were removed by distillation and the residue was distilled under reduced pressure. There was thus obtained 84.6 g. (86% yield) of p-toluensulfonyl isocyanate in the form of a liquid having a boiling point of 91 to 92° C. at a pressure of 0.5 mm. of mercury. The identity of the product was confirmed by infrared spectral analysis and by reaction with n-butylamine in dry benzene solution to yield the known compound 1-n-butyl-3-(p-toluenesulfonyl)urea having a melting point of 124 to 127° C. identical with an authentic sample.

EXAMPLE 2

To 885 ml. of chlorobenzene was added 171 g. (1.0 mole) of p-toluenesulfonamide. After azeotropic removal of traces of water and addition of 9.8 g. (0.2 mole) of n-butyl isocyanate at 70° C. about 1.3 mole of phosgene was added at the rate of about 1.0 gram per minute at 129° C. over a period of 150 minutes. After purging the mixture with nitrogen, the chlorobenzene and the n-butyl isocyanate were distilled off and recovered. Vacuum distillation of the residue yielded 89.2 g. (90.8% of theory) of p-toluenesulfonyl isocyanate, boiling at 87 to 89° C./ 0.5 mm.

The mixture of chlorobenzene and n-butyl isocyanate which was recovered from the above mixture by distillation was then used to dissolve 171 g. of p-toluenesulfonamide. The resulting solution was heated at 127 to 130° C. while phosgene was passed into the mixture at a rate of 1 gram per minute for 200 minutes. The resulting mixture was purged with nitrogen before removing the mixture of chlorobenzene and n-butyl isocyanate by distillation. The residue was distilled under reduced pressure to give 181.3 g. (92.2% theory) of p-toluenesulfonylisocyanate having a boiling point of 111° C. at 1.1 mm. of mercury.

EXAMPLE 3

To a solution of 85.5 g. (0.5 moles) of p-toluenesulfonamide in 855 ml. of chlorobenzene, after azeotropic removal of traces of water, was added 12.5 g. (0.1 mole) of cyclohexyl isocyanate at 90° C. Approximately 1.3 moles of phosgene was added to the reaction mixture over a period of 130 minutes at 130° C. After removal of the chlorobenzene and the cyclohexyl isocyanate by distillation the residue was distilled in vacuum to give 91.8 g. (93% yield) of p-toluenesulfonyl isocyanate, boiling at 90–92° C./0.5 mm.

EXAMPLE 4

To a solution of 85.5 g. (0.5 moles) of p-toluenesulfonamide in 855 ml. of chlorobenzene, after azeotropic removal of traces of water, was added 11.9 g. (0.1 mole) of phenyl isocyanate at 85° C. To the resulting mixture was added approximately 2.8 moles of phosgene over a period of 280 minutes at 128–130° C. After purging the product with nitrogen for 30 minutes and distillation of the chlorobenzene which contains the phenyl isocyanate the residue was distilled in vacuo to yield 84 g. (85.3% yield) of p-toluenesulfonyl isocyanate, boiling at 110 to 115° C./0.7–0.8 mm.

EXAMPLE 5

To a solution of 78.5 g. (0.5 moles) of benzenesulfonamide in 588 ml. of chlorobenzene, after azeotropic removal of traces of water, was added 9.9 g. (0.1 mole) of n-butyl isocyanate at 75° C. To the resulting mixture was added approximately 1 mole of phosgene, over a period of 100 minutes at 129 to 130° C. After purging the product with nitrogen for 30 minutes followed by distillation of the chlorobenzene containing the n-butyl isocyanate, the residue was distilled in vacuo to yield 78 g. (85.8%) of benzenesulfonyl isocyanate, boiling at 86–87° C./0.7 mm. The infrared spectrum of the material in $CCl_4$ showed strong absorptions at $4.48\mu$ ($SO_2NCO$) and $7.3$ and $8.5\mu$ ($—SO_2—$).

EXAMPLE 6

To a solution of 191.5 g. (1 mole) of p-chlorobenzenesulfonamide in 1000 ml. of chlorobenzene was added, after azeotropic removal of water, 40 g. (0.4 moles) of n-butyl isocyanate at 100° C., followed by approximately 1.8 moles of phosgene over a period of 180 minutes at 128–130° C. At the end of this time the mixture was purged with nitrogen and the chlorobenzene containing 31 g. (by analysis) of n-butyl isocyanate was removed by distillation. Vacuum distillation of the residue afforded 193.5 g. (89%) of p-chlorobenzenesulfonyl isocyanate boiling at 92–93° C./0.4 mm.

The identity of the product was confirmed by its infrared spectrum in $CCl_4$ which shows absorptions at $4.48\mu$ ($—SO_2NCO$) and $7.3\mu$ and $8.49\mu$ ($—SO_2—$) and by conversion (reaction with N-aminohexamethyleneimine) to the known 1-(p-chlorobenzenesulfonyl)-3-hexahydro-1-H-azepin-1-yl urea melting at 202–203° C. and identical with an authentic specimen.

EXAMPLE 7

To a solution of 74 g. (0.4 moles) of 2,5-dimethylbenzenesulfonamide in 740 ml. of chlorobenzene was added 8 g. (0.08 moles) of n-butyl isocyanate at 100° C. To the resulting solution was added 1.4 moles of phosgene over a period of 140 minutes at 128–130° C. The reaction mixture was then purged with nitrogen for 30 minutes and the chlorobenzene containing the n-butyl isocyanate was removed by distillation. Vacuum distillation of the residue afforded 51 g. (60.5%) of 2,5-dimethylbenzenesulfonyl isocyanate, boiling at 95–97° C./0.5 mm.

The product was characterized by its infrared spectrum in $CCl_4$ which showed strong absorptions at $4.48\mu$ ($—SO_2NCO$) and $7.3\mu$ and $8.5\mu$ ($—SO_2—$) and by conversion to its methyl urethane, melting at 163–164° C.

Analysis.—Calcd. for $C_{10}H_{13}NO_4S$: C, 49.36; H, 5.38; N, 5.75. Found: C, 49.42; H, 5.47; N, 5.88.

This novel compound is useful as a stabilising agent for organic isocyanates as set forth above and is also useful as an intermediate, by reaction with butylamine in accordance with conventional procedures, in the preparation of $N^1$-(2,5-dimethylbenzenesulfonyl)-$N^3$-butylurea, an antidiabetic agent.

EXAMPLE 8

To a solution of 89.6 g. (0.4 moles) of 2,5-dichlorobenzene-sulfonamide in 896 ml. of chlorobenzene was added 8 g. (0.08 moles of n-butyl isocyanate at 95° C. Since, after addition to this solution of approximately 0.8 moles of phosgene over a period of 80 minutes at 128° C., substantial amounts of starting sulfonaimde were still present, an additional 8 g. (0.08 moles) of n-butyl isocyanate was added followed by another 3.4 moles of phosgene over a period of 340 minutes at 128–130° C. After purging with nitrogen and distillation of the chlorobenzene which contains the n-butyl isocyanate, 32.1 g. (32%) of 2,5-dichlorobenzenesulfonyl isocyanate having a boiling point of 118–120° C./0.5 mm. was obtained by vacuum distillation of the residue.

The product was characterized by its infrared spectrum in $CCl_4$ which showed strong absorptions at $4.48\mu$ ($—SO_2NCO$) and $7.2\mu$ and $8.42\mu$ ($—SO_2—$) and by conversion to the methyl urethane, melting at 188–189° C., on addition to an excess of methanol.

Analysis.—Calcd. for $C_8H_7Cl_2NO_4S$: C, 33.81; H, 2.48; N, 4.92. Found: C, 33.95; H, 2.72; N, 5.12

This compound (2,5-dichlorobenzenesulfonyl isocyanate) is useful as a stabilising agent for organic isocyanates as set forth above and is also useful as an intermediate, by reaction with butylamine in accordance with conventional procedures, in the preparation of $N^1$-(2,5-dichlorobenzenesulfonyl) - $N^3$ - butylurea, an antidiabetic agent.

EXAMPLE 9

To a solution of 73.4 g. (0.325 moles) of 3,4-dichlorobenzenesulfonamide in 730 ml. of chlorobenzene was added 12.8 g. (0.13 moles) of n-butyl isocyanate. The resulting solution was heated to 128–130° C. and 161 g. (1.6 moles) of phosgene was added over a period of 161 minutes. After purging the resulting mixture with nitrogen for 30 minutes and removing the chlorobenzene (which contained the n-butyl isocyanate) by distillation, the residue was distilled to give 81.9 g. (91.3%) of 3,4-dichlorobenzenesulfonyl isocyanate, boiling at 128–130° C./0.6 mm.

The product was characterized by its infrared spectrum in $CCl_4$ which showed strong absorption at $4.48\mu$ ($—SO_2NCO$) and $7.25\mu$ and $8.45\mu$ ($—SO_2—$) and by conversion to the methyl urethane, melting at 142–143° C., on addition to an excess of methanol.

Analysis.—Calcd. for $C_8H_7Cl_2NO_4S$: C, 33.81; H, 2.48; N, 4.92. Found: C, 33.92; H, 2.60; N, 5.28.

This compound (3,4-dichlorobenzenesulfonyl isocyanate) is useful as a stabilising agent for organic isocyanates as set forth above and is also useful as an intermediate, by reaction with butylamine, in accordance with conventional procedures, in the preparation of $N^1$-(3,4-dichlorobenznesulfonyl)-$N^3$-butylurea, an antidiabetic agent.

EXAMPLE 10

To a solution of 20.2 g. (0.1 moles) of p-nitrobenzenesulfonamide in 200 ml. of dry o-dichlorobenzene, was added 3.96 g. (0.04 moles) of n-butyl isocyanate. The reaction mixture was heated to 176° C. and 46 g. (0.46 moles) of phosgene was added over a period of 46 minutes. After purging the mixture with nitrogen and distillation of the o-dichlorobenzene which contains the n-butyl isocyanate the residue was distilled under vacuum to give 18.5 g. (81% yield) of p-nitrobenzenesulfonyl isocyanate, boiling at 137–143° C./0.4 mm. and melting at 70–73° C.

The product was characterized by its infrared spectrum in $CCl_4$ which showed strong absorptions at $4.47\mu$ ($—SO_2NCO$), $7.22\mu$ and $8.42\mu$ ($—SO_2—$) and $7.42\mu$ ($—NO_2$) and by conversion to its methyl urethane melting point at 152–155° C.

Analysis.—Calcd. for $C_8H_8N_2O_6S$: C, 36.92; H, 3.09; N, 10.76. Found: C, 36.57; H, 3.27; N, 10.91.

This compound (p-nitrobenzenesulfonyl isocyanate) is useful as a stabilising agent for organic isocyanates as set forth above, and is also useful as an intermediate by reaction with butylamine, in accordance with conventional procedures, and reduction with Raney nickel of the intermediate $N^1$-(p-nitrobenzenesulfonyl)-$N^3$-butylurea, in the preparation of $N^1$-sulfanilyl-$N^3$-butylurea, an antidiabetic agent.

EXAMPLE 11

To a solution of 40.3 g. (0.2 moles) of m-nitrobenzene sulfonamide in 400 ml. of o-dichlorobenzene was added 4 g. (0.04 moles) of n-butyl isocyanate. After heating the solution to reflux, 55 g. (175% excess) of phosgene was added over a period of 55 minutes at 170–180° C. Purging the mixture with nitrogen for 30 minutes followed by evaporation of solvent and vacuum distillation of the residue afforded 35.5 g. (78%) of m-nitrobenzene sulfonyl isocyanate, boiling at 152–153° C./1 mm. and melting at 84–86° C.

A sample of the product was converted to its methyl urethane melting at 124–125° C.

*Analysis.*—Calcd. for $C_8H_8N_2O_6S$: C, 36.92; H, 3.0; N, 10.76. Found: C, 36.92; H, 3.08; N, 10.53.

This compound (m-nitrobenzenesulfonyl isocyanate) is useful as a stabilising agent for organic isocyanates as set forth above, and is also useful as an intermediate, by reaction with butylamine, in accordance with conventional procedures, and reduction with Raney nickel of the intermediate $N^1$-(m-nitrobenzenesulfonyl) - $N^3$ - butylurea, in the preparation of $N^1$-(m-aminobenzenesulfonyl)-$N^3$-butylurea, an antidiabetic agent.

EXAMPLE 12

A solution in 500 ml. of chlorobenzene of 70.8 g. (0.3 moles) of p-bromobenzene sulmonamide and 12 g. (0.12 mole) of n-butylisocyanate was heated to reflux and 80 g. (165% excess) of phosgene was added over a period of 80 minutes at 128–130° C. Purging of the mixture with nitrogen for 30 minutes followed by removal of the solvent by distillation and vacuum distillation of the residue afforded 70.3 g. (89.5%) of p-bromobenzenesulfonyl isocyanate, boiling at 117–120° C./1.2 mm. and melting at 38–40° C.

A sample of the product was converted to its methyl urethane melting at 121–122° C.

*Analysis.*—Calcd. for $C_8H_8BrNO_4S$: N, 4.76. Found: N, 4.32.

This compound (p-bromobenzenesulfonyl isocyanate) is useful as a stabilising agent for organic isocyanates as set forth above, and is also useful as an intermediate, by reaction with butylamine, in accordance with conventional procedures, in the preparation of $N^1$-(p-bromobenzenesulfonyl)-$N^3$-butylurea, an antidiabetic agent.

EXAMPLE 13

To a solution of 20 g. (0.13 moles) of p-fluorobenzene sulfonamide in 200 ml. of chlorobenzene was added 3.0 g. (0.03 moles) of n-butylisocyanate. After heating the mixture to reflux, 54 g. (0.54 moles) of phosgene was added over a period of 54 minutes at 127–130° C. Purging the the resulting product with nitrogen for 30 minutes followed by removal of the solvent by distillation and vacuum distillation of the residue afforded 19 g. (73% yield) of p-fluorobenzenesulfonyl isocyanate, boiling at 94–95° C./0.9 mm.

A sample of the product was converted to its methyl urethane melting at 112–114° C.

*Analysis.*—Calcd. for $C_6H_8FNO_4S$: N, 6.00. Found: N, 5.75.

This compound (p-fluorobenzenesulfonyl isocyanate) is useufl as a stabilising agent for organic isocyanates as set forth above, and is also useful a an intermediate, by reaction with butylamine, in accordance with conventional procedures in the preparation of $N^1$-(p-fluorobenzenesulfonyl)-$N^3$-butylurea, an antidiabetic agent.

EXAMPLE 14

Using the procdure described in Example 1, but replacing n-butyl isocyanate by 2-hexyl isocyanate, there is obtained p-toluenesulfonyl isocyanate.

Similarly using the procedure described in Example 1, but replacing n-butyl isocyanate by other hydrocarbyl isocyanates such as hexamethylene diisocyanate, allyl isocyanate, 4-ethoxybutyl isocyanate, 3,3,3-trifluoropropyl isocyanate, 2-methylthioethyl isocyanate, 3-dimethylamineopropyl isocyanate, 4-cyanobutyl isocyanate, and the like, there is obtained p-toluenesulfonyl isocyanate in comparably high yield.

EXAMPLE 15

Using the procedure described in Example 4, but replacing phenyl isocyanate by p-tolyl isocyanate, there is obtained p-toluenesulfonyl isocyanate in comparably high yield.

Similarly, using the procedure described in Example 4, but replacing phenyl isocyanate by other hydrocarbyl isocyanates such as 2-naphthyl isocyanate, 4-biphenylyl isocyanate, 4,4'-methylenebis(phenyl isocyanate), phenylene-1,4-diisocyanate, and the like, there is obtained p-toluenesulfonyl isocyanate in comparably high yield.

EXAMPLE 16

Using the procedure described in Example 11 but replacing m-nitrobenzenesulfonamide by o-nitrobenzenesulfonamide, there is obtained o-nitrobenzenesulfonyl isocyanate.

EXAMPLE 17

To a solution of 46.75 g. (0.25 moles) of pe-methoxybenzene sulfonamide in 468 ml. of chlorobenzene was added 4.95 g. (0.05 moles) of n-butylisocyanate. After heating the mixture to reflux, 80 g. (0.8 moles) of phosgene was added over a period of 80 minutes at 130-132° C. Purging of the resulting product with nitrogen for 60 minutes followed by removal of the solvent by distillation and vacuum distillation of the residue afforded 46.5 g. (87.8%) of p-methoxybenzenesulfonyl isocyanate, boiling point 130–133°/0.4 mm.

A sample of the product was converted to its methyl urethane, melting point 126–127° C.

*Analysis.*—Calcd, for $C_9H_{11}NO_5S$: N, 5.72. Found: N, 5.98.

This compound (p-methoxybenzenesulfonyl isocyanate) is useful as a stabilising agent for organic isocyanates as set forth above, and is also useful as an intermediate, by reaction with butylamine in accordance with conventional procedures, in the preparation of $N^1$-(p-methoxybenzenesulfonyl)-$N^3$-butylurea, an antidiabetic agent.

Using the above procedure, but replacing p-methoxybenzenesulfonamide by o-methoxy and m-methoxybenzene sulfonamide, there are obtained o-methoxybenzenesulfonyl isocyanate and m-methoxybenzenesulfonyl isocyanate, respectively.

EXAMPLE 18

Phosgene was added at a rate of 1 g. per minute over a period of 1.75 hr. to a mixture of 42.8 g. (0.2 mole) of p-isothiocyanatobenzenesulfonamide (McKee, J. Am. Chem. Soc. 68, 2506, 1964) and 8.56 g. of n-butyl isocyanate in 500 ml. of o-dichlorobenzene at a temperature of 150–163° C. To the resulting mixture was added a further 8.56 g. of n-butyl isocyanate and passage of phosgene at the above rate was continued for a further 45 minutes at 163° C. The solution so obtained was purged with nitrogen for 30 minutes at 163 to 167° C. after which the o-dichlorobenzene was removed by distillation under reduced pressure. The residue (58 g.) was divided into two equal parts. One part was distilled under reduced pressure to give 18.9 g. (78.8% overall yield) of p-isothiocyanatobenzenesulfonyl isocyanate having a boiling point of 140° C. at a pressure of 2 mm. of mercury, and a melting point of 64 to 67° C. A portion of the compound was converted to the corresponding methyl p-isothiocyanatobenzenesulfonyl carbamate, melting point 150 to 153° C. by reaction with excess methanol. The carbamate (in chloroform solution) exhibited maxima at 2.97, 3.1, 4.75 to 4.95 and 5.72µ in the infrared absorption spectrum.

*Analysis.*—Calcd. for $C_9H_8N_2O_4S$: C, 39.72; H, 2.96; N, 10.29. Found: C, 39.46; H, 2.64; N, 10.32.

The above p-isothiocyanatobenzenesulfonyl isocyanate and the corresponding carbamate are useful as fungicides, for example in controlling infestations caused by seed-borne and soil-borne fungi such as those set forth hereinabove.

EXAMPLE 19

Using the procedure set forth in Example 18, but replacing p-isothiocyanatobenzene sulfonamide by m-isothiocyanatobenzenesulfonamide, there is obtained m-isothiocyanathobenzenesulfonyl isocyanate.

Similarly, using the procedure set forth in Example 18, but replacing p - isothiocyanatobenzenesulfonamide by other isothiocyanato-substituted arenesulfonamides such as 1-isothiocyanatonaphthalene-4-sulfonamide, 2-isothiocyanathonaphthalene - 5 - sulfonamide, 1-isothiocyanatonaphthalene - 7-sulfonamide, 3-isothiocyanato-4-methoxybenzenesulfonamide, 4 - isothiocyanato-3-methylbenzenesulfonamide, and the like, there are obtained the corresponding isothiocyanatoarenesulfonyl isocyanates such as 1 - isothiocyanatonaphthalene - 4-sulfonylisocyanate, 2-isothiocyanatonaphthalene - 4 - sulfonyl isocyanate, 1-isothiocyanatonaphthalene - 7 - sulfonyl isocyanate, 3-isothiocyanato-4-methoxybenzenesulfonyl isocyanate, and 4-isothiocyanato - 3 - methylbenzenesulfonyl isocyanate, respectively.

The isothiocyanato arenesulfonamides employed as starting materials can be prepared by reacting the corresponding aminoarenesulfonamide with thiophosgene using the procedure described by McKee, supra.

We claim:

1. A semi-continuous process for the preparation of an arenesulfonyl isocyanate, wherein arene is selected from the class consisting of phenyl, naphthyl, biphenylyl, phenanthryl, and anthracenyl, which comprises the steps of reacting the corresponding arenesulfonamide with phosgene at a temperature within the range of about 60° C. to about 200° C. in the presence of an inert organic solvent and about 0.1 mole to about 0.8 mole, per mole of arenesulfonamide, of a hydrocarbyl isocyanate having a boiling point within the range of about 60° to about 200° C., wherein the hydrocarbyl residue is free from substituents reactive with phosgene and is selected from the class consisting of alkyl from 1 to 18 carbon atoms, inclusive, cycloalkyl from 4 to 8 carbon atoms, inclusive, alkenyl from 2 to 18 carbon atoms, inclusive, cycloalkenyl from 5 to 8 carbon atoms, inclusive, aralkyl from 7 to 13 carbon atoms, inclusive, and aryl from 6 to 14 carbon atoms, inclusive, and, when the conversion of arenesulfonamide to arenesulfonyl isocyanate is substantially complete, removing the inert organic solvent and hydrocarbyl isocyanate from the reaction mixture by distillation leaving a residue of the desired arenesulfonyl isocyanate, and using the recovered mixture of hydrocarbyl isocyanate and inert organic solvent as the reaction medium for a subsequent conversion of arenesulfonamide to arenesulfonyl isocyanate.

2. A process according to claim 7 wherein the hydrocarbyl isocyanate is n-butyl isocyanate.

3. A process according to claim 1 wherein the hydrocarbyl isocyanate is phenyl isocyanate.

4. m-Isothiocyanatobenzenesulfonyl isocyanate.

5. p-Isothiocyanathobenzenesulfonyl isocyanate.

References Cited

UNITED STATES PATENTS

| | | | |
|---|---|---|---|
| 2,666,787 | 1/1954 | Krzikalla | 260—545 |
| 3,185,677 | 5/1965 | Davis | 260—239 |
| 3,379,758 | 4/1968 | Ulrich | 260—545 |

OTHER REFERENCES

Logemann et al., Chem. Ber. 90:2530 (1957).

HENRY R. JILES, Primary Examiner

C. M. SHURKO, Assistant Examiner

U.S. Cl. X.R.

260—239, 247.1, 268, 293.4, 326.5, 454, 465, 465.1, 465.4, 465.5, 465.6, 465.7, 465.8, 465.9, 470, 471, 545, 553, 556, 999